Nov. 1, 1966
G. R. ASCHAUER
3,282,386
ACTUATING MECHANISM OF THE CENTRIFUGALLY OPERATED
ROTATING FLUID CYLINDER TYPE
Filed Nov. 17, 1964
2 Sheets-Sheet 1
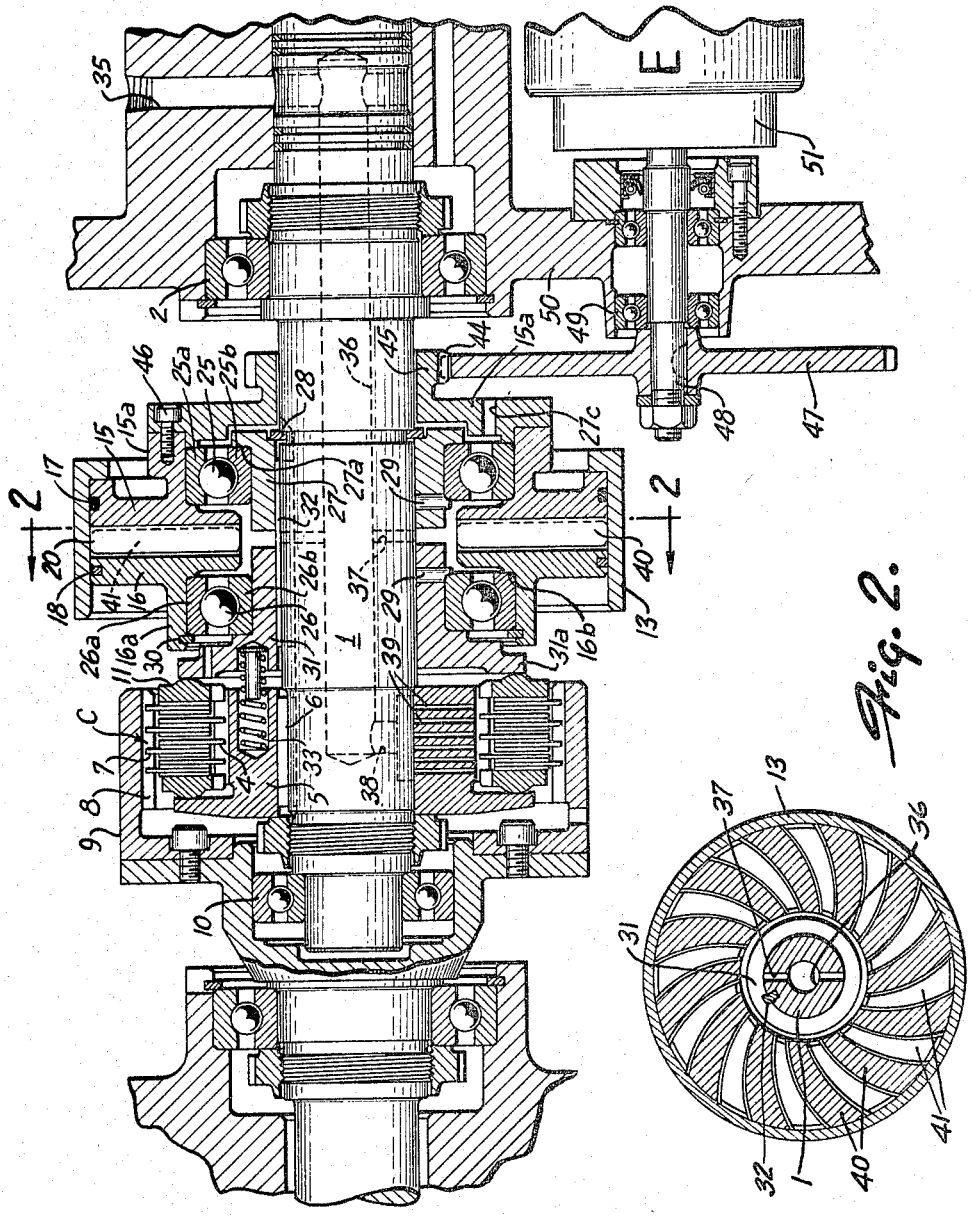
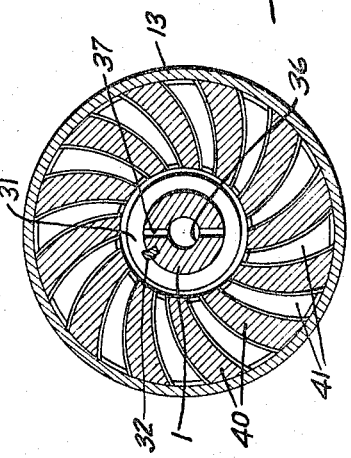
INVENTOR.
GEORGE R. ASCHAUER
BY
James E. Nilles
ATTORNEY

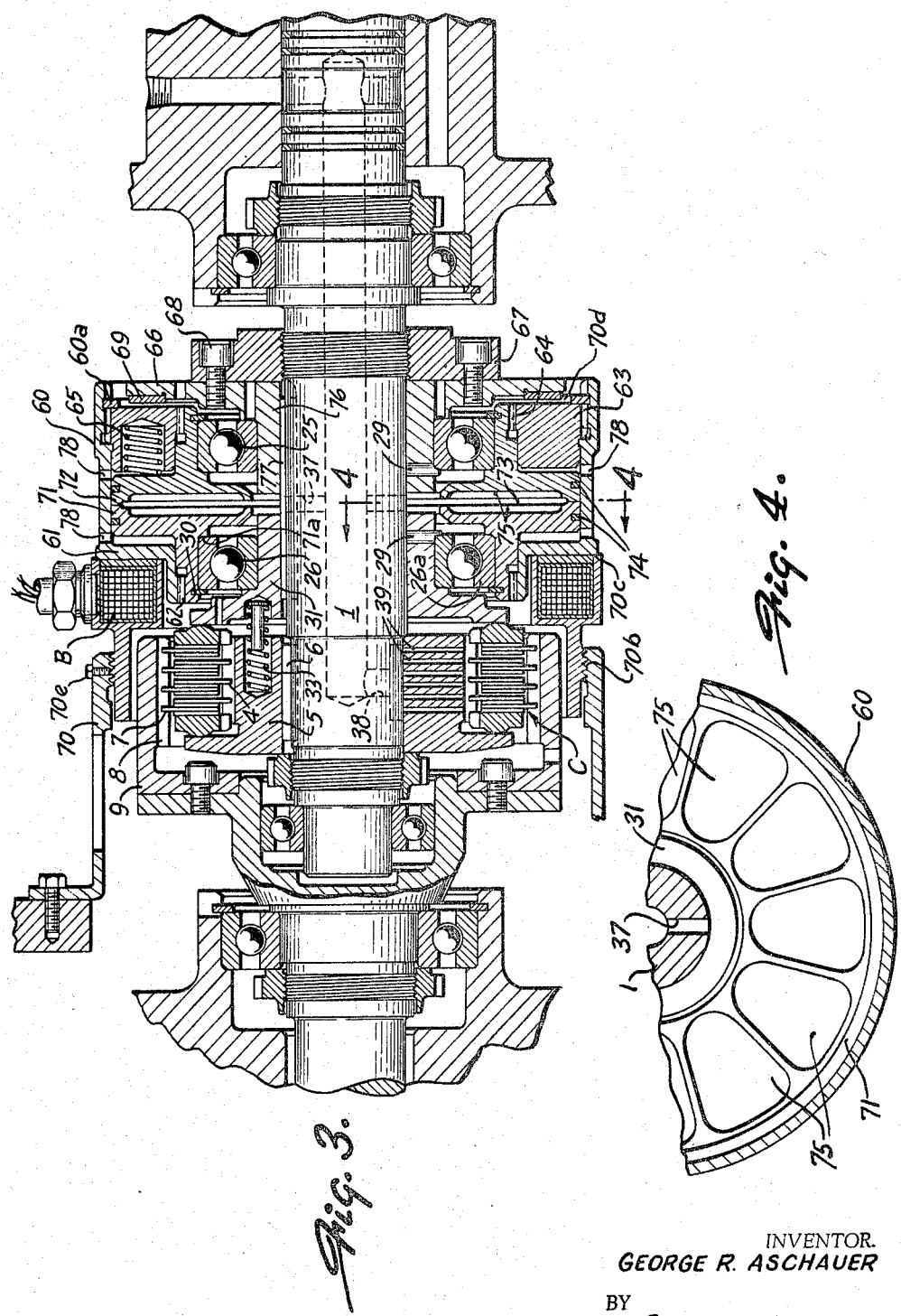

United States Patent Office 3,282,386
Patented Nov. 1, 1966

3,282,386
ACTUATING MECHANISM OF THE CENTRIFUGALLY OPERATED ROTATING FLUID CYLINDER TYPE
George R. Aschauer, Racine, Wis., assignor to Twin Disc Clutch Company, Racine, Wis., a corporation of Wisconsin
Filed Nov. 17, 1964, Ser. No. 411,900
10 Claims. (Cl. 192—105)

This invention relates generally to centrifugally operated actuating mechanism, such as clutches, thrusters, or the like.

The present invention provides a centrifugally operated actuating mechanism which utilizes a rotating fluid cylinder including a pair of axially separable action parts; these action parts develop clamping or actuating thrust in accordance with the amount of centrifugal head generated due to fluid located between the action parts.

More specifically, the present invention provides a mechanism of the above type in which the action parts are mounted for rotation independently of either the power input or output members of the mechanism. The actuating mechanism so provided is thus capable of operating independently of input or output speeds and the actuating thrust can be developed completely independent of those speeds.

Another aspect of the invention relates to a particularly efficient rotating fluid cylinder wherein the fluid accelerates and decelerates together with the cylinder and responds quickly to any speed changes. The resulting actuating mechanism is particularly sensitive and responsive.

A general object of the invention is to provide an improved, high-speed actuating mechanism which has infinitely variable control independently of input or output speeds.

These and other objects and advantages of the present invention will appear hereinafter as this disclosure progresses, reference being had to the accompanying drawings, in which:

FIGURE 1 is a longitudinal, cross-sectional view through a mechanism embodying the present invention;

FIGURE 2 is a sectional view taken along line 2—2 in FIGURE 1;

FIGURE 3 is a longitudinal, cross-sectional view through another mechanism embodying the present invention; and FIGURE 4 is a cross-sectional view taken along line 4—4 in FIGURE 3.

The present invention is in the nature of an improvement over the subject matter of my co-pending United States application Serial Number 305,730, filed August 30, 1963, entitled "Centrifugally Operated Actuating Mechanism," which issued on May 18, 1965 as United States Patent Number 3,184,025.

FIGURES 1 AND 2

This actuating mechanism includes a drive member which takes the form of a shaft 1 that is suitably journalled in conventional anti-friction bearing assemblies 2 so that it may be rotatably driven from any power source (not shown). The mechanism can be used to actuate any one of a number of pieces of equipment, for example, it can be used in aircraft to operate a wing flap or the like. In the embodiment shown, however, the mechanism is illustrated as being connected with and operating an actuatable member in the form of a conventional friction disc clutch C. For this purpose a series of clutch discs 4 are splined to a hub member 5 which in turn is fixed by key 6 to the shaft 1. Another group of discs 7 are interleaved with discs 4 and are also axially shiftable by means of the spline connection 8 with the driven member 9. One end of the shaft 1 is journalled by anti-friction bearings 10 in the central portion of the driven member 9. The clutch operates in the conventional way and when the pressure plate 11 is pushed to the left, as viewed in the drawings, the clutch pack is compressed and the clutch is engaged, thus effecting a drive between the shaft 1 and the driven member 9.

A cylinder 13 is mounted around the drive member 1 and is in coaxial alignment therewith and as will appear, it can rotate relative to the drive member.

A pair of disc shaped or annular pistons 15 and 16 are mounted around the drive member and are located within the cylinder 13. Conventional seals 17 and 18 are located between pistons 15 and 16, respectively, and the cylinder 13 so as to form a fluid seal therebetween. Additionally, the cylinder 13 is press fit onto the periphery of the piston 15 so as to actually form an integral unit therewith. That is to say, the cylinder 13 and piston 15 are axially fixed relative to one another while piston 16 is axially slidable with respect thereto. In this manner, a fluid chamber 20 is formed between the piston and the cylinder. It will be appreciated that the cylinder 13 can be of various axial lengths depending on the amount of stroke desired of the mechanism.

The pistons 15 and 16 are each rotatably supported on the drive member 1 by means of the anti-friction bearing assemblies 25 and 26, respectively. More specifically, assembly 25 has an outer race 25a on which the piston 15 is mounted by its axial flange portion 15a. The bearing assembly 25 also includes an inner race 25b which is mounted on a sleeve 27 which is keyed to shaft 1 by key 32. The sleeve has a shoulder 27a against which the bearing assembly 25 abuts and is thereby axially fixed against shifting in one direction. A pin 29 extends through the sleeve 27 and engages the inner race 25b so as to prevent axial displacement of the bearing assembly 25 in the opposite direction. A snap ring 28 is located on the drive member 1 and prevents axial displacement of the sleeve 27 to the right as viewed in FIGURE 1.

The other bearing assembly 26 includes an outer race 26a on which is mounted the piston 16 by its axial flange 16a. The piston 16 is held in place on the bearing by the shoulder 16b and the snap ring 30. The inner race 26b of assembly 26 is fixed on a sleeve or shifter member 31. Shifter 31 rotates with and is axially slidable on the drive member 1 by the key 32. The shifter member includes a radially extending portion 31a which abuts against the pressure plate 11 for actuating the latter, as will appear.

A series of axially disposed springs 33 are located and act between the hub 5 and the shifter 31 so as to urge the latter to the right, as viewed in the drawings, that is to say, to a declutched position.

With the above construction, it wil be seen that the pistons and cylinder together form a rotatable fluid cylinder assembly which is mounted on the anti-friction bearing means and in a manner so as to be completely independent of the speed of either the drive member 1 or the actuatable member C.

Means are provided for continuously furnishing low pressure fluid, such as oil, to the chamber 20 between the pistons. Various forms of fluid may be used and in the embodiment shown, reference will be made to a fluid such as oil. This fluid may be furnished from any conventional source (not shown), and is admitted via passage 35 to the axial passage 36 in drive member 1 and then into the cross ports 37 that lead to the chamber between the pistons. This same lubricant and cooling oil may also enter the cross ports 38 and then the smaller ports 39 in hub 5 so as to cool the clutch plates in the conventional manner.

The oil thus can enter chamber 20, and when the mechanism is rotating the centrifugal force forces the oil toward the outer side of the chamber, that is against the inner side of cylinder 13. The faster the mechanism is rotated, the greater will be the head of oil which is generated in the chamber and this head urges the pistons axially apart from one another. More specifically, the centrifugal head urges the piston 16 to the left (as viewed in the drawings) and thereby the piston 16 together with its bearing assembly 26 and shifter member 31 is urged toward the clutch engaging position.

Means are provided between the pistons to insure that the volume of fluid therebetween accelerates and decelerates together with the rotative speed changes of the piston. By making the volume of fluid quickly responsive to any speed changes, a very sensitive mechanism is provided and this is accomplished as follows. A series of vanes secured to the pistons extend generally radially in the chamber 20 and act to regulate or control the movement of the fluid. More specifically, these interleaved vanes 40 and 41 are carried, respectively, by the pistons 15 and 16, and as viwed in FIGURE 2, the vanes are of a curved configuration but extend generally in a radial direction. As the pistons move axially relative to one another, the vanes simply slide past one another and are always effective to substantially synchronize the rotative speed of the fluid with that of the pistons. In a high speed device of the type in which the present mechanism finds particular utility, this control of the fluid as to its rotational speed relative to the pistons is important.

In order to relieve any fluid pressure that may build up behind the bearing assemblies 25 and 26, a fluid passage 27c is formed in the sidewall 15a of the piston 15 while the side of the piston 16 is open and thereby permits ready flow of the excess fluid past the bearing.

Means are provided for rotating the cylinder assembly at various speeds to thereby cause a centrifugal head to be generated in any desired amount within the chamber 20, as follows. An external gear 44 is formed around the periphery of an axially extending portion 45 of the wall 15a of the piston 15. A large gear 47 is rotatably driven by its shaft 48 which in turn is suitably journalled in anti-friction bearings 49 in any suitable part of an adjacent frame 50. Shaft 48 in turn is driven by any means, such as for example, a small variable speed electric motor E and this drive mechanism for shaft 48 may also include a modulating clutch 51. This means for driving the cylinder assembly thus comprises an independent drive means, that is to say, one which is capable of driving the assembly independently of the drive member 1 and at any speed relative thereto.

*FIGURES 3 and 4*

The form of the invention shown in FIGURE 3 includes many parts which are similar to those shown in FIGURE 1 and have been correspondingly numbered and need no further description.

In this embodiment, a cylinder 60 is axially slidable and includes an end wall 61 having a series of splines 62, and an opposite end wall member 63 which is slidable in an axial direction by means of splines 64 which connect it to a piston 72, to be described. The cylinder wall 63 is urged to the right (FIGURE 3) or towards the end of the cylinder 60, that is against snap ring 60a, by means of a series of springs 65. The drive member 1 has a radial flange 66 fixed thereon and a friction surface 69 is located on the flange and adjacent the end wall 63 of the cylinder. Thus the end wall 63 and flange 66 constitute a friction clutch means between the drive member and the cylinder. An electric coil type brake means B is carried by the stationary frame member 70 and is axially adjustable relative to cylinder 60 by means of the threaded connections 70b and set screw 70e. The coil B is thereby rotated to adjust the air gap as at 70c between the coil and cylinder wall 61.

When energized, the coil attracts the side wall 61 of the cylinder in any selected degree of engagement, that is, it acts to draw the cylinder to the left, as viewed in the drawing, or away from the clutch member 69. Stated otherwise, when the coil is fully energized (see FIGURE 3) the cylinder, and specifically cylinder wall 63, is fully retracted by snap ring 60a from engagement with the clutch member 69. As a result, an air gap exists as at 70d and under those circumstances the cylinder does not rotate. On the other hand, when the coil is de-energized completely the cylinder is urged by springs 65 into full engagement with the drive member 1 via the friction clutch means 69.

The coil can be de-energized as slowly as desired and any desired speed of the mechanism can be held for any desired period of time. Any percentage of the total clutching effort can be obtained. The cylinder 60 can be drivingly connected to the drive member in any degree, that is, it may be driven by the drive member at any selective speed relative thereto. It will be noted that in this embodiment then, the power utilized to rotate the cylinder is taken from the input or drive member 1.

A pair of pistons 71 and 72 are located within the cylinder and form an expansible fluid chamber 73 therewith. Pistons 71 and 72 are fixed for rotation with cylinder 60 by means of the sprines 62 and 64, respectively, which also permit axial sliding within and relative to the cylinders. Conventional oil seals 74 are located between the pistons and the cylinder.

Pockets 75 are formed in the pistons for the purpose of accelerating the fluid as do the vanes of the FIGURE 1 device.

The ball bearing assembly 25 is mounted on the sleeve member 76 and it will be noted that the radial wall 66 is formed as a portion of this sleeve member, and the latter is axially fixed on drive member 1. Sleeve members 31 and 76 are both slidably mounted by key 77 on the drive member 1 for rotation therewith. Bearing assembly 26 provides the support for mounting piston 71 on the sleeve 31, and snap ring 30 and shoulder 71a hold the piston captive on the outer race 26a of bearing assembly 26. Holes 78 extend through the cylinder to permit escape of fluid that may become trapped between the outer sides of the pistons and the cylinder.

*Résumé*

In either form of the invention shown there has been provided a high speed actuating mechanism in which the axial thrust provided by the mechanism is dependent on the rotative speed of the cylinder assembly. In turn, the rotative speed of the cylinder assembly is independent of the speed of either the input drive member or the member to be actuated. The cylinder assembly includes a pair of pistons which are mounted on anti-friction bearings and independently of the input or output speed of the mechanism.

The entire mechanism is quickly and accurately controlled and is very responsive and sensitive in operation.

With the present arrangement, centrifugal heads can be developed which are independent of input or output speeds and the resultant axial thrust increases as the square of the rotative speed of the cylinder assembly; it is thereby possible to obtain many times the clamping force that would be obtained with conventional centrifugally operated clutching devices.

Various modes of carrying out the invention are contemplated as being within the scope of the following claims particularly pointing out and distinctly claiming the subject matter which is regarded as the invention:

1. An actuating mechanism comprising, a rotatable drive member, a cylinder around said drive member, anti-friction bearing means supported by said drive member, a pair of pistons within said cylinder and mounted on said bearing means and defining an expansible fluid chamber with said cylinder, an actuatable member, at least one of said pistons being mounted for axial shifting to provide relative axial movement between said pistons and thereby form said expansible chamber, said one piston being associated with said actuatable member to cause actuation thereof when said piston is shifted, said pistons and cylinder forming a fluid cylinder assembly which is rotatable on said bearing means independently of said drive member and said actuatable member, passage means for introducing fluid into said chamber while said cylinder is rotating, and positive control means for rotating said cylinder assembly at various speeds to thereby cause a centrifugal head to be generated in said chamber and a consequent axial thrust by said one piston which is proportional to the rotative speed of said assembly.

2. Mechanism as defined in claim 1 including a series of vanes carried by at least one of said pistons and extending generally radially into said chamber between said pistons for facilitating acceleration and deceleration of fluid in said chamber as the speed of the assembly changes.

3. Mechanism as defined in claim 1 further characterized in that said actuatable member includes a clutch pack mounted on said drive member and adjacent said one piston.

4. Mechanism as set forth in claim 3 including, a shifter member rotatably mounted on said drive member and engageable with said actuatable member, one of said bearing means being mounted on said shifter member for supporting said one piston thereon for axial shifting therewith.

5. Mechanism as defined in claim 1 further characterized in that said anti-friction bearing means includes a pair of ball bearing assemblies, one for each piston, each assembly having an inner and an outer race, said pistons being mounted on said outer race of their respective bearing assembly.

6. Mechanism as defined in claim 5 including a shifter member rotatably mounted on said drive member, the inner race of one of said bearing assemblies being mounted on said shifter member.

7. Mechanism as defined in claim 6 further characterized in that the inner race of the other bearing assembly is fixed on said drive member against axially movement in a direction away from said one bearing assembly.

8. Mechanism as defined in claim 1 further characterized in that said cylinder is fixed to one of said pistons.

9. Mechanism as defined in claim 1 further characterized in that said means for rotating said cylinder assembly is comprised of gear means independent of said drive member.

10. Mechanism as defined in claim 1 further characterized in that said cylinder is axially shiftable, and including a clutch connection between said drive member and said cylinder, and an electrical coil means for selectively shifting said cylinder into varying degress of engagement with said drive member via said clutch connection.

References Cited by the Examiner
UNITED STATES PATENTS

| | | | |
|---|---|---|---|
| 1,618,644 | 2/1927 | Dickson | 192—105 |
| 2,074,510 | 3/1937 | Junkers | 192—103 |
| 2,209,884 | 7/1940 | Halford | 192—105 |
| 3,184,025 | 5/1965 | Aschauer | 192—105 |

DAVID J. WILLIAMOWSKY, *Primary Examiner.*

BENJAMIN W. WYCHE, III, *Examiner.*